Sept. 28, 1943.   J. T. HEPBURN   2,330,354
SHAPING OR CUTTING MACHINE
Filed Nov. 25, 1941   3 Sheets-Sheet 1

INVENTOR
J. T. HEPBURN.
BY Eugene E. Stevens
ATTORNEY.

INVENTOR
J. T. HEPBURN.
BY Eugene E. Stevens
ATTORNEY

INVENTOR
J.T. HEPBURN
BY Eugene E. Stevens
ATTORNEY

Patented Sept. 28, 1943

2,330,354

UNITED STATES PATENT OFFICE 2,330,354

SHAPING OR CUTTING MACHINE

John T. Hepburn, Toronto, Ontario, Canada

Application November 25, 1941, Serial No. 420,434

2 Claims. (Cl. 82—24)

This invention relates to shaping or cutting machines, as for instance, lathes and the like and particularly concerns automatic control means therefor through which a cutting tool may be automatically engaged with and disengaged from material being cut.

The invention may conveniently be illustrated by reference to a lathe and the machining of shells. In this sphere it is usual to form a projection or pip on the end of the shell which is used in machining operations but it is necessary finally to cut away this projection. This has been done by clamping the shell in the lathe and causing the cutting tool to traverse the base of the shell during which time it engages the pip and cuts it away. A difficulty which has been experienced in this operation, however, has been that upon reversal of the movement of the cutting tool to return it to its normal position the tool contacts with the base of the shell and cuts or marks it unless the operator of the machine is alert and removes the cutting tool from the proximity of the shell base at the end of the cutting operation and prior to the return of the cutting tool to its normal position. On the other hand, even if the operator does remove the cutting tool, the operation in hand is delayed while he performs this function before reversing the mechanism. Moreover, before the next cutting operation is proceeded with it is either necessary for the operator to set the tool again in position so as to cut the pip at the proper point or to employ special mechanism to do so. Thus, either another delay is caused before setting the cutting mechanism in motion again or additional mechanism is required.

It is an object of the present invention to eliminate the disadvantages outlined and to provide a machine in which the cutting tool is automatically set in cutting position as the machine is set in motion for the cutting operation and which will remove the cutting tool from proximity of the material simultaneously with the reversal of the mechanism.

A further object of the invention is to provide a simplified mechanism of this type which may readily be applied to machines generally employed in cutting, shaping and metal working.

With these and other objects in view the invention in general combination comprises a means for holding the material to be worked upon, a tool holder positioned relatively to the material and capable of movement along beside a surface of the material with actuating means for moving the tool holder backward and forward along such surface including control means for initiating this movement. Coupled with this is a means for moving the tool towards and away from the material into and out of operating position and a means actuated by the control means for operating the tool moving means to position the tool in cutting position simultaneously with the forward motion of the tool holder and to remove the tool from cutting position upon reverse movement of the tool holder.

This mechanism may take various forms, one simple form of which is illustrated in the present application and from which the invention will be understood by reference to the following detailed description taken in conjunction with the accompanying drawings.

In the drawings:

Fig. 1 is a side elevation of a lathe illustrating the tool holder and also illustrating a part of the control means for moving the tool towards and away from the material being worked upon.

Fig. 2 is a front elevation of part of a lathe showing the tool holder and means for moving it alongside a surface of the material being worked upon, said view illustrating the control for such movement and a means whereby the tool may simultaneously be shifted axially into engagement with the material to be worked upon, and Fig. 3 is a top plan view of Fig. 2, and Fig. 4 is a transverse section taken through the tool holder and associated mechanism for actuating it.

Figure 1:
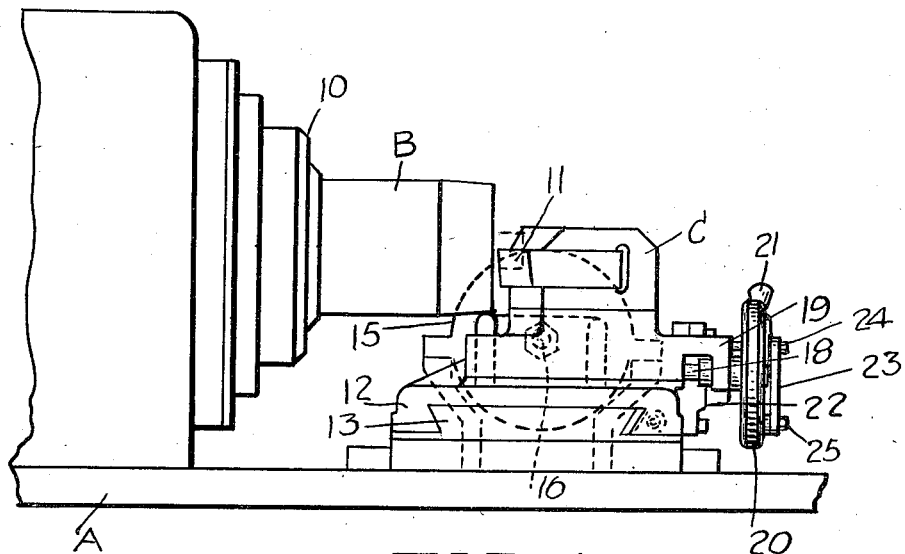

Referring to the drawings, A indicates the base of a lathe or the like of usual construction including a chuck 10 designed to hold and rotate material to be worked upon such as a shell B. Mounted on the lathe is a tool holder C carrying an axially movable tool 11. The tool holder C is carried on a suitable base plate or carriage 12 reciprocable transversely of the lathe on a suitable dovetailed slide 13. The slide is of a length so that the tool holder C is positioned to one side of the material to be worked upon and the tool holder may be shifted transversely on the slide to move beside a surface of the material carried in the lathe.

The transverse movement of the tool holder C, in either direction, is effected by an operating unit and preferably by means of a combination of a pneumatic cylinder 14 and a hydraulic cylinder 15 connected by rod 16 with an upstanding flange or the like on the base or carriage 12 so that reciprocation of the rod 16 will cause the base 12 and carried tool holder C to move forwardly and rearwardly along the slide 13.

The tool 11 is carried in the tool holder C which in turn is movable at right angles to its base 12 along a slide 11a and, in the present illustration, will move towards and away from the base of the shell B. This movement is effected by means of a screw threaded shaft 18 rotatably carried by a bracket 19 on the tool holder and which is in screw threaded engagement with the screw threaded bore of a stationary sleeve 19a in the base of the tool holder. The shaft 18 may be rotated in any suitable manner such as by a wheel or disk 20 keyed thereto and upon rotation of which in one direction or the other, the shaft 18 will rotate correspondingly to cause the tool to move, by means of the tool holder, forward along slide 11a into engagement with the material or rearwardly from engagement with it.

Figure 6:
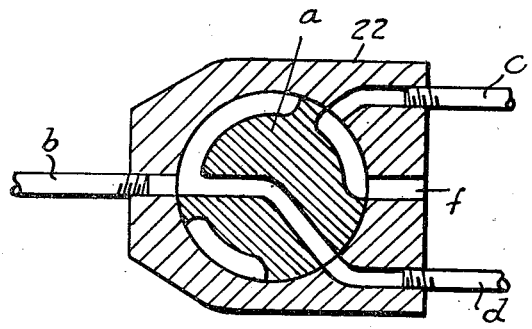
Fig. 6 is a section taken through a control valve operated by control means for reversing the movement of the actuating means.
Figure 7:
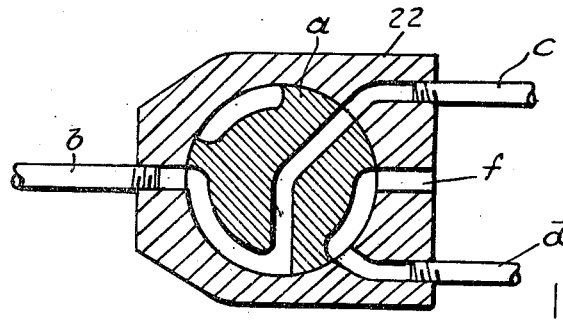
Fig. 7 is a section taken through the control valve similarly to Fig. 6 but showing the valve in reversed position.

To control the operation of the cylinder 14, I provide a suitable control lever 21 designed in one extreme position to direct the flow of motive fluid to the cylinder 14 in such a path as to move the carriage or base 12 of the tool holder to the left and in the other extreme position to move it to the right. The control lever is designed to actuate the valve plug $a$ (see Figs. 6 and 7) to connect the air supply pipe $b$ with either of the flexible pipe lines $c$ or $d$, either one of which when not connected to the supply pipe $b$ exhausts through the exhaust passage $f$. The pipe lines $c$ and $d$ connect with opposite ends of the cylinder 14 so as to cause its piston to move in one direction or the other. Fluid in the cylinder 15 is moved from one side of its piston to the other by means of a conduit $g$ with which a valve $h$ may be associated so that the speed of transfer of the fluid in cylinder 15 from one side of the piston to the other may be effected at a given rate, thus to control the speed at which the carriage 12 is moved by the piston rod 16. The control valve is carried in the casing 22 which I position adjacent to and movable with the tool holder.

Figure 2:
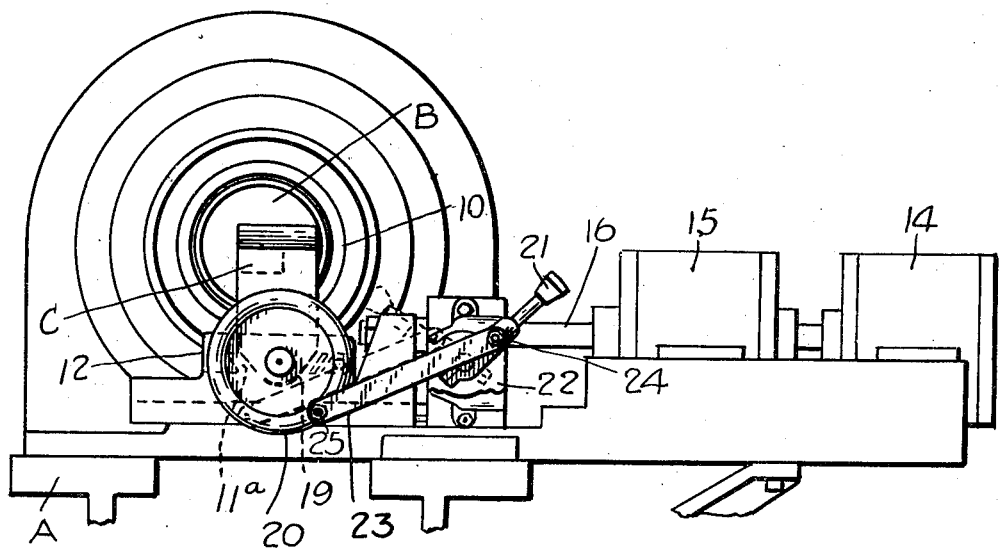
Figure 3:
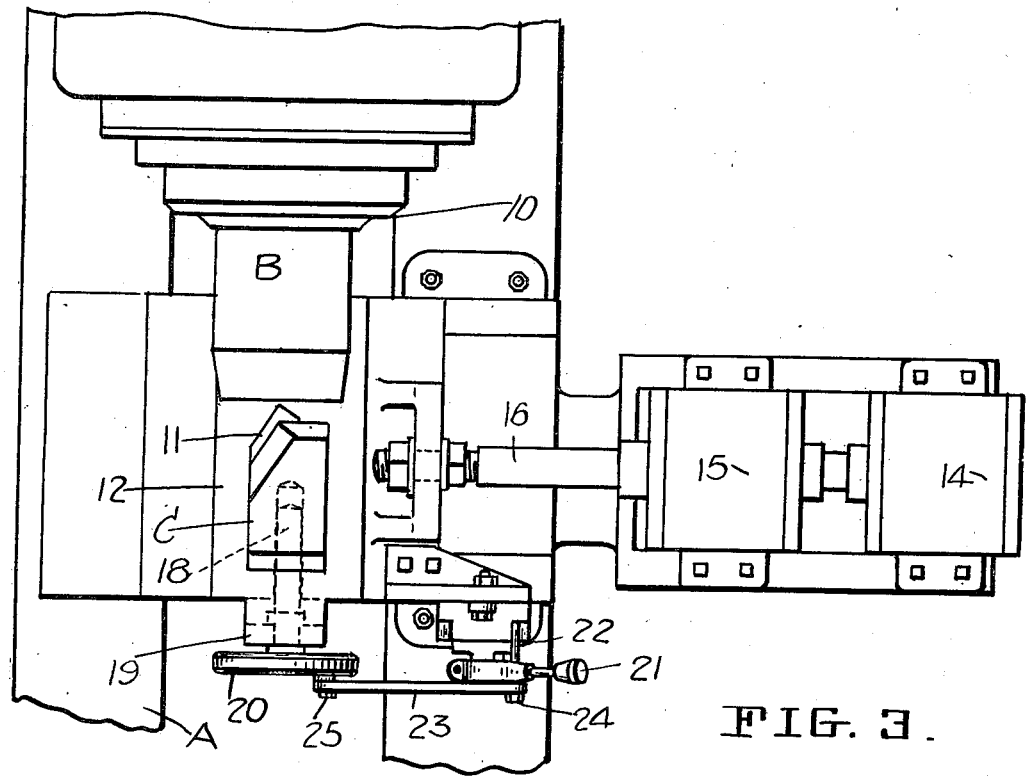
Figure 4:
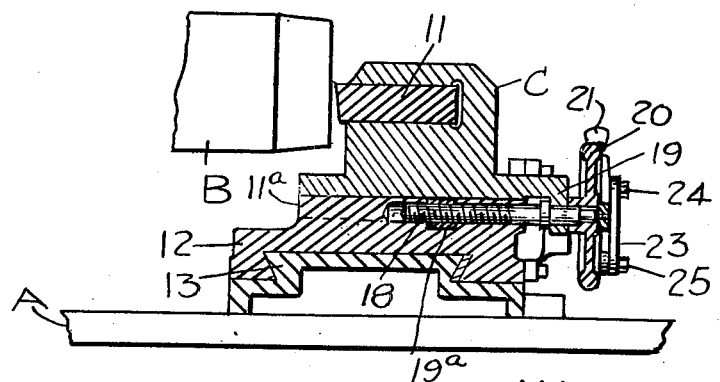
Figure 5:
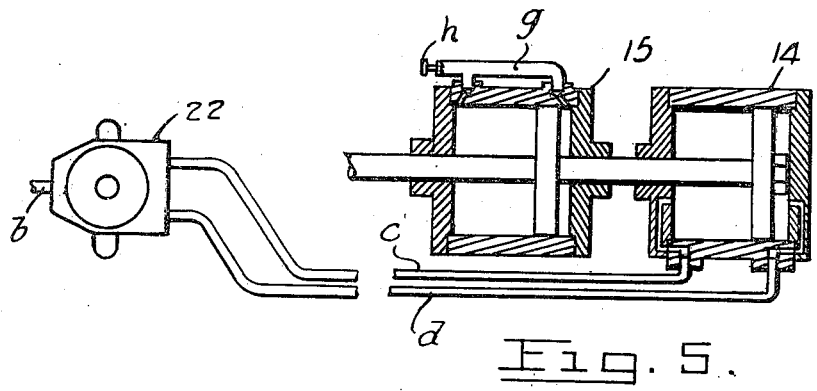
Fig. 5 is a longitudinal section taken through the mechanism for actuating the tool holder.

The control lever 21 is connected with the wheel or disk 20 by means of a link 23 which is pivotally connected at one end as at 24 to the control lever 21 and pivotally connected at its other end as at 25 to the wheel or disk 20. Thus, when the control lever 21 is swung to the dotted line position shown in Fig. 2 in order to cause the base 12 and tool holder C to move along the surface of the material the simultaneous partial rotation of the disk 20 will cause the screw threaded shaft 18 to rotate and move the movable tool mounting along its slide and inwardly towards the material, positioning the tool in accurate cutting position. In this instance by selecting the length of the link 23 and its point of connection on the control lever 21 the extent to which the tool is inwardly projected may be accurately gauged. Accordingly the link 23 and its connection with the control lever 21 forms a means for controlling the extent to which the tool may be shifted in towards the material being worked upon.

In the present instance when the control lever 21 is shifted to its dotted line position the base 12 and carried tool holder C moves along the slide 13 across the base of the shell B. Simultaneously, the tool holder C and the tool 11 are moved at right angles to the base to project the tool into cutting position by means of the link 23, disk 20, and threaded shaft 18, so that the tool engages the projecting pip which is cut off as the tool passes across the base of the rotating shell. When the tool holder has moved to the end of its stroke, the control lever 21 is thrown to its full line position (Fig. 2) and the motive fluid is reversed in cylinder 14 so as to reverse the movement of the tool holder and its base 12 to return it to normal position ready for the next cutting operation. Simultaneously with the return of this lever to normal position the tool is retracted from cutting position by means of the link 23 so that the tool holder is returned to normal position on its base and the tool will not in this instance contact with the material and score or mark it.

From the foregoing it will be appreciated that the invention not only eliminates the possibility of scoring or marking of the material being worked upon but it also functions to eliminate delays incident to setting the tool in its proper cutting position before it commences its cutting operation and retracting the tool from the work prior to returning the tool holder to its normal position for its next piece of work and resetting the tool. Thus, the invention will serve to speed up production, assure precision of operation and improve the quality of the work.

It will, of course, be obvious that various means might be employed for connecting the control and the tool shifting mechanism. Moreover, it will also be obvious that the shaping and cutting apparatus may be applied to various types of operation and it is by no means confined to the cutting operation for shells and the like such as has been used for the purpose of illustrating the practicability of the invention.

What I claim as my invention is:

1. A machine for shaping or cutting material comprising in combination means for holding the material, a tool holder for positioning a cutting tool relatively to the material, means for moving the tool holder forward or backward along beside a surface of the material, control means for controlling the movement of said moving means for the tool holder, means for moving the tool towards and away from the material into and out of operating position and means actuated by said control means for actuating the tool moving means to position the tool in operating position on forward motion of the tool holder and to withdraw the tool from operating position upon reverse movement of the tool holder, said means for moving the tool holder including a prime mover disposed at an angle to the tool holder and operatively connected therewith to move the tool holder in forward or reverse direction, said control means being connected with the prime mover to control its movement and including a reciprocal lever and mounting therefor movable with the tool holder, said tool moving means including a rotatable screw threaded shaft in threaded engagement with the tool holder and on which the tool holder is movable and an operating member for rotating the shaft, said control lever and operating member being link connected to operate in unison.

2. A machine for shaping or cutting material comprising in combination means for holding the material, a tool holder for positioning a cutting tool relatively to the material, an operating unit connected with the tool holder for moving the tool holder in two directions, forward or backward along beside a surface of the material, control means for causing movement of said operating unit in one direction or the other, said means including a lever operable to two positions respectively to cause the tool holder to move in one direction or the other, means for moving the tool towards and away from the material into and out of operating position, including a rotatable screw-threaded shaft operatively connected to the tool holder to cause movement of the tool holder on rotation of the shaft, an operating member for rotating the shaft, said control lever and operating member being link connected to operate simultaneously one with the other, for actuating the tool moving means towards the material on forward motion of the tool holder and to withdraw the tool away from the material upon reverse movement of the tool holder.

JOHN T. HEPBURN.